UNITED STATES PATENT OFFICE.

HAROLD LLOYD LYON AND SAMUEL STODOLE PECK, OF HONOLULU, TERRITORY OF HAWAII.

PROCESS OF MAKING DECOLORIZING AGENTS AND THE PRODUCTS THEREOF.

1,251,546.      Specification of Letters Patent.      Patented Jan. 1, 1918.

No Drawing. Application filed September 20, 1915, Serial No. 51,646. Renewed May 26, 1917. Serial No. 171,305.

*To all whom it may concern:*

Be it known that we, HAROLD LLOYD LYON and SAMUEL STODOLE PECK, citizens of the United States, both residing at the city of Honolulu, in the county of Honolulu, Territory of Hawaii, have jointly invented certain new and useful Improvements in Processes of Making Decolorizing Agents and the Products Thereof, of which the following is a specification.

This invention relates to processes of making a decolorizing agent and products thereof; and it comprises a method of making and regenerating a decolorizing agent for the purification of sugar juices, sugar solutions, oils, and other liquids, wherein molasses is treated with sulfuric acid to char the same and form an active decolorizing carbon, the molasses being first mingled if desired with a body-giving ingredient which is advantageously kieselguhr, and the acid treated material is then extracted to free it of sulfates and other soluble mineral matters; and it also comprises a process of regenerating such decolorizing material after use upon liquids to be purified, wherein it is once more treated with sulfuric acid in the same manner; and it further comprises as a new article of manufacture, a decolorizing carbon produced by the acid-charring of molasses, such carbon if desired containing a reinforcing or bulk-giving mineral matter such as kieselguhr; all as more fully hereinafter set forth and as claimed.

In the decolorization of sugar juices and syrups and other liquid or fusible substances, such as oils, glycerin, greases, waxes, etc., it is common to take advantage of the adsorptive power of various kinds of carbon for coloring matters and other impurities. The various kinds of carbon differ very much among themselves in their power of removing impurities from liquids treated therewith. The best known and earliest of these decolorizing carbons was of course boneblack. In boneblack, the carbon exists as thin layers or films covering the surfaces of the porous mineral matter of the bone. Partly because of its fine state of subdivision and almost infinite porosity, boneblack carbon has a very high decolorizing value. Boneblack being a relatively expensive material and one that is costly in use, there have been very many efforts to produce cheaper forms of decolorizing carbon. Many of these substitutes are on the market, but they do not have as high a decolorizing value as can be desired, or have other objections, such as excessive cost, difficulty of regeneration, etc. This is probably due, at least in part, to the physical form in which the carbon occurs.

In the use of boneblack and its substitutes in decolorizing sugar solutions, etc., it is used in either one of two ways. In one way the finely powdered material is added directly to the juice or other liquid and stirred up therewith; being subsequently removed by a filtration operation. In the other manner of use, the boneblack or decolorizing carbon is used as a filter bed.

It is the object of the present invention to produce an efficient form of carbon in a relatively cheap and simple manner with the production of certain useful by-products. To this end, we avail ourselves of the fact that sulfuric acid, and certain other acids, in contact with organic bodies, char them with the production of a finely divided form of carbon. While other acids and materials may be used for this purpose, we find that sulfuric acid is well adapted for our purposes. As the organic material we use molasses, which yields a carbon having an exceptionally high adsorptive or decolorizing value. Final molasses from either beet or cane sugar manufacture is well suited for our purposes. These molasses contain sugars and also a large number of other organic compounds which are charred by the action of the acid. In addition, molasses contains a quantity of potash and to a lesser extent, other fertilizing constituents.

On adding sulfuric acid to the molasses and gently heating if necessary, the mass swells up and chars, giving off various gases. In the mass remains the excess of sulfuric acid used (which need not be great) and a number of soluble substances, these being mostly sulfates of the bases present. Among these substances is always a large amount of salts of potash, both cane molasses and beet molasses being rich in potash. The free acid and soluble substances should next be washed out. It is our practice to wash until the washings are substantially neutral to blue litmus paper, although for treating some liquors the presence of a little residual acidity is not objectionable; in such event we do not wash so far.

The extract, because of the presence of the sulfate of potash and of some other bodies, is a valuable fertilizing material. When used for fertilizing purposes, it may be desirable to recover it in as concentrated a form as possible; i. e., very little water should be used for the first washings. Subsequent washings may be concentrated or used locally. The extract may be used as it is; or after a neutralization with an alkali or alkaline earth such as lime, calcium carbonate, etc. When neutralized with lime or lime compounds, the extract may be used as an addition to manures because of the ammonia fixing property of the sulfate of calcium formed. Or the extract may be used for decomposing phosphates to give a compound fertilizer. The gases evolved in the charring operation are rich in sulfur dioxid and may advantageously be led into a limed sugar juice for the purpose of sulfuring it.

The quantity of sulfuric acid necessary varies with the particular molasses; being larger as the molasses contains more water. The amount necessary also varies with the particular way of charring used. If charring is aided by heat less acid is necessary but it is often found more economical to produce the full charring effect from acid without the use of additional heat, using a little more acid. Ordinary commercial sulfuric acid may be employed. As stated, charring may be aided by a gentle heat.

In a specific embodiment of our invention, to final cane molasses we add an equal weight of 98 per cent. commercial sulfuric acid. Action starts in at once and becomes vigorous on gentle heating or if the proportion of acid is increased. The evolved gases, where the operation is conducted in the sugar house, may be led into sugar liquors as they have a considerable bleaching and lime removing value. After the action of the acid ceases, the wet or damp mass is submitted to suction to remove the solution of acid and salts remaining in it and thereafter is well washed. Or the mass may be diluted somewhat with water and then filtered and washed. In either case the extract may be treated as previously described; i. e., with lime, phosphates, etc. The washed material on the filter is a very fine form of carbon with high decolorizing value. It is added directly to a sugar solution to be decolorized and agitated therewith, the action being aided by heat if necessary or desirable. After the action is complete, it is filtered out, carrying with it the coloring matter of the sugar solution and giving a decolorized filtrate. After removal from the sugar solution, it is dried with or without previous washing, and once more exposed to the action of sulfuric acid for the purpose of regeneration. The sulfuric acid carbonizes the absorbed impurities and produces a material like that originally made.

If the decolorizing carbon is to be used for the treatment of oils or other non-aqueous liquors, it should be dried after the washing operation. When charged with impurities from oil. etc., it may be treated with sulfuric acid in the manner just described for the purpose of regeneration.

As just described, the operation relates to the manufacture of a very fine or pulverulent carbon of high decolorizing value. Where the material is desired in a somewhat coarser form, or is desired for use in filter beds and the like, it is a useful expedient to incorporate with the molasses prior to charring, a body or bulk-giving mineral material, such as kieselguhr or diatomaceous earth. Wood charcoal, clay, and many substances may be used as carriers or body giving substances. For instance, open pored pellets or granules of baked clay may be impregnated with molasses, dried somewhat, and then be treated with acid. Kieselguhr may be treated in the same way.

In a specific embodiment of our invention employing kieselguhr as a body giving ingredient, we mix kieselguhr and molasses in the proportion of fifteen pounds of kieselguhr to one hundred pounds of molasses, final molasses being used, and thereafter treat the mixture with one hundred pounds of commercial sulfuric acid, specific gravity 1.84. As before, carbonizing may be aided by gentle heat. After the action of the acid is complete, the mixture is leached or extracted and washed as previously described. The carbon so produced and containing a body giving mineral ingredient may be regenerated in the manner just describel for the carbon alone.

Decolorizing carbon preparations made in the manner as described above may be regenerated and reused an indefinite number of times.

The carbon to which this preparation owes its efficiency does not come altogether from sugar since molasses contains many other organic bodies.

Instead of using strong sulfuric acid directly upon the material, the molasses, or body-giving or carrier substance impregnated with molasses. may be mixed with weak sulfuric acid and the mixture heated to evaporate off the excess of water and produce charring. Weak sulfuric acid is particularly convenient in regeneration. In all cases, heating when resorted to should be without too much access of air.

Where kieselguhr is employed, it also gives a fine material, suitable for direct admixture with the juices or other liquids to be treated. Owing to the peculiar microscopic structure of the kieselguhr grains, the particles thus formed are themselves porous and contain thin films of carbon in the pores. Where clay or other body-giving material is employed, it may be used in pellets of any shape or size. For example, in making a material to be used in filter beds, baked clay pellets or fragments of about one-tenth inch in diameter may be employed. Granulated pumice stone is another carrier which may be used. While these carriers super-add a certain clarifying power of their own to the material, their main utility in the present invention is in giving body to the carbon.

As stated, either beet or cane molasses or a mixture of the two may be used.

What we claim is:

1. The process of producing a decolorizing material which comprises treating molasses with sulfuric acid until charring ensues and removing the soluble substances from the char so formed.

2. The process of producing a decolorizing material which comprises treating molasses with sulfuric acid until charring ensues, and removing the soluble substances as a concentrated extract from the char so formed.

3. The process of producing a decolorizing material which comprises mixing molasses with a body-giving material, treating the mixture with sulfuric acid until charring ensues, and removing the soluble substances from the char so formed.

4. The process of producing a decolorizing material which comprises mixing molasses with kieselguhr, treating the mixture with sulfuric acid until charring ensues, and removing the soluble substances from the char so formed.

5. The process of producing a decolorizing material which comprises mixing molasses with a body-giving material, treating the mixture with sulfuric acid until charring ensues, and removing the soluble substances as a concentrated extract from the char so formed.

6. The process of producing a decolorizing material which comprises mixing molasses with kieselguhr, treating the mixture with sulfuric acid until charring ensues, and removing the soluble substances as a concentrated extract from the char so formed.

7. In the manufacture and use of decolorizing carbon, the process which comprises producing a decolorizing carbon by charring molasses with sulfuric acid and repeating the treatment with sulfuric acid whenever activity of the carbon diminishes.

8. In the preparation of decolorizing materials, the process which comprises treating molasses charged with soluble materials with sulfuric acid until charring ensues, and removing the soluble matter from the char so produced.

9. As a new composition of matter for decolorizing purposes, an acid-charred molasses carbon free of soluble matter.

10. As a new composition of matter for decolorizing purposes, a body-giving agent coated or impregnated with an acid-charred molasses carbon.

11. As a new composition of matter for decolorizing purposes, kieselguhr coated or impregnated with an acid-charred molasses carbon.

In testimony whereof, we affix our respective signatures hereto, this 7th day of September, 1915, in the presence of two subscribing witnesses.

HAROLD LLOYD LYON.
SAMUEL STODOLE PECK.

Witnesses:
Louis John Warren,
Joseph Doris Marques.